United States Patent [19]

Schatteman et al.

[11] Patent Number: 4,589,101
[45] Date of Patent: May 13, 1986

[54] LINEAR CHANGER APPARATUS

[75] Inventors: Etienne A. M. Schatteman, Wemmel; Philippe V. Denis, Genappe, both of Belgium

[73] Assignee: Staar S.A., Brussels, Belgium

[21] Appl. No.: 687,021

[22] Filed: Dec. 28, 1984

[30] Foreign Application Priority Data

Jun. 1, 1984 [BE] Belgium .................. 0/213058

[51] Int. Cl.⁴ .................................. G11B 17/28
[52] U.S. Cl. .................................. 369/38; 369/36
[58] Field of Search .................. 369/36, 37, 38, 39

[56] References Cited

U.S. PATENT DOCUMENTS

| 1,868,846 | 7/1932 | Oyston | 369/38 |
| 1,869,770 | 8/1932 | Oyston | 369/36 |
| 2,398,067 | 4/1946 | Winkler | 369/36 |
| 2,946,594 | 7/1960 | Staar | 369/39 |
| 2,992,006 | 7/1961 | Foufounis | 369/37 |
| 4,513,409 | 4/1985 | Staar | 369/77.1 |

OTHER PUBLICATIONS

*Megadoc, A Modular System for Electronic Document Handling*, de Vos, Phillips Technical Review, vol. 39, No. 12 1980, pp. 329–342.

*Primary Examiner*—Steven L. Stephan
*Attorney, Agent, or Firm*—Leydig, Voit & Mayer, Ltd.

[57] ABSTRACT

Apparatus for recording and/or playback of recordings on discs including a selective disc changer suited particularly for discs of the "compact disc" type. The playback unit has a housing mounted for helicoidal movement between a disc operating plane and an entrance plane for receiving a disc inserted edgewise and rolling into the housing along the entrance plane. A removable magazine provides a plurality of disc storage compartments arranged side by side and successively movable into alignment with the entrance plane, the magazine being received on a tray mounted on the chassis of the apparatus. The magazine is locked against being removed from the tray responsive to transfer of a disc from a storage compartment of the magazine to ensure that the magazine is locked against removal from the time that one of the discs stored in a compartment of the magazine has left its storage position until it is returned to the magazine compartment.

20 Claims, 9 Drawing Figures

LINEAR CHANGER APPARATUS

TECHNICAL FIELD

The present invention relates to apparatus for recording and/or reproducing sound from discs or cassettes and, more particularly, to automatic changer apparatus having a removable magazine for storing discs or cassettes.

BACKGROUND ART

Heretofore, a magazine in apparatus of this type is either maintained by a locking device in association with its drive means which forms part of the apparatus—the locking device being merely actuable for the magazine to be removed—or it is simply disposed on a tray which forms part of the apparatus and may or may not have a locking device for securing the magazine on the tray.

Generally, the user may remove the magazine from the apparatus at any time either by removing it from the tray or by releasing the locking device.

Although such magazines are useful, they present a significant disadvantage in that a magazine can be removed from the apparatus while a disc or cassette (hereinafter referred to as a "disc") which it originally stored remains in its operative position in the playback portion of the apparatus. If the user places another magazine on the apparatus, the loader mechanism will either be forced to transfer the disc in the operative position in the playback unit to a storage recess in the magazine which is already occupied, or the loader will attempt to bring a disc into the operative position in the playback unit while another disc is already there. In both cases, the apparatus and the disc may suffer damage and the mechanism will be completely blocked.

Another problem with automatic changers is the slow changer speed and long interval between playing of discs, particularly with changers that allow selection of discs from a magazine as distinguished from merely playing them in succession.

SUMMARY OF THE INVENTION

The main object of the present invention is to overcome these disadvantages by very simple and reliable means.

A second object of the invention is to provide for locking a removable magazine on a tray which is operated with the transfer of a disc from the magazine and is likewise reliable and very simple to use.

Another object is to provide for high speed and reliable changer operation so as to minimize the time between playing of discs.

In order to achieve these objects, according to the invention, a locking member is provided which is actuated in response to the transfer of a disc from the storage magazine, to ensure that the magazine is locked to its drive means from the time that one of the discs stored in the magazine has left its storage position until it is returned to the magazine. Also included is a detector assembly and control capable of sensing magazine position while the magazine is shifted at high speed during a changer cycle.

DESCRIPTION OF THE BEST MODE

The apparatus described herein and embodying the invention is a "compact disc" type of disc changer comprising a main chassis bearing a reproduction and/or recording unit and a removable magazine. For convenience in reference, the term "playback unit" will be used to mean a unit which may be used for reproduction and/or recording and the term "disc" will be used to mean a disc or cassette since the magazine according to this invention may be constructed for either.

Figure 1:
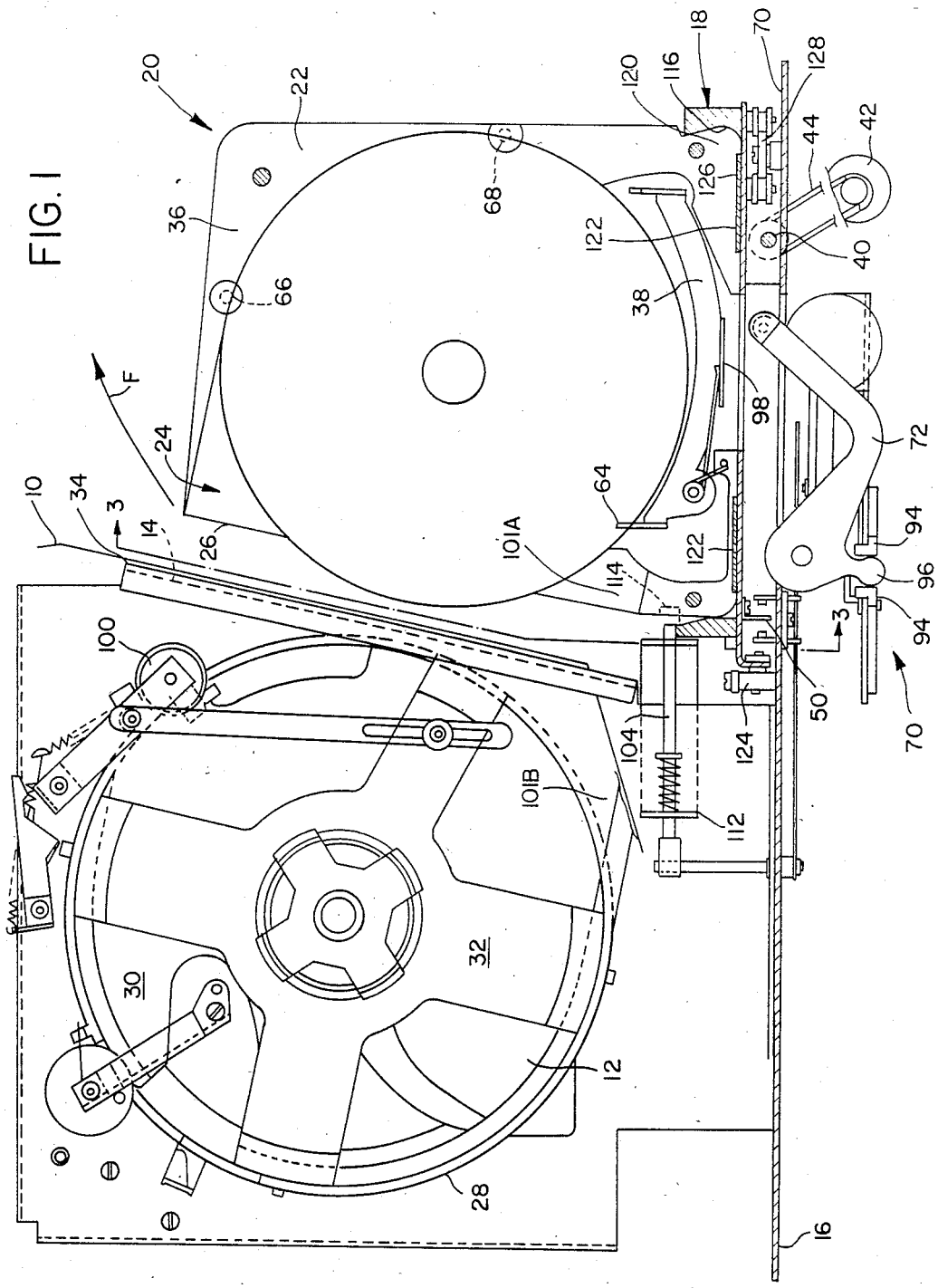
FIG. 1 is a side view of apparatus constructed according to the invention with a disc in storage position in the magazine.
Figure 3:
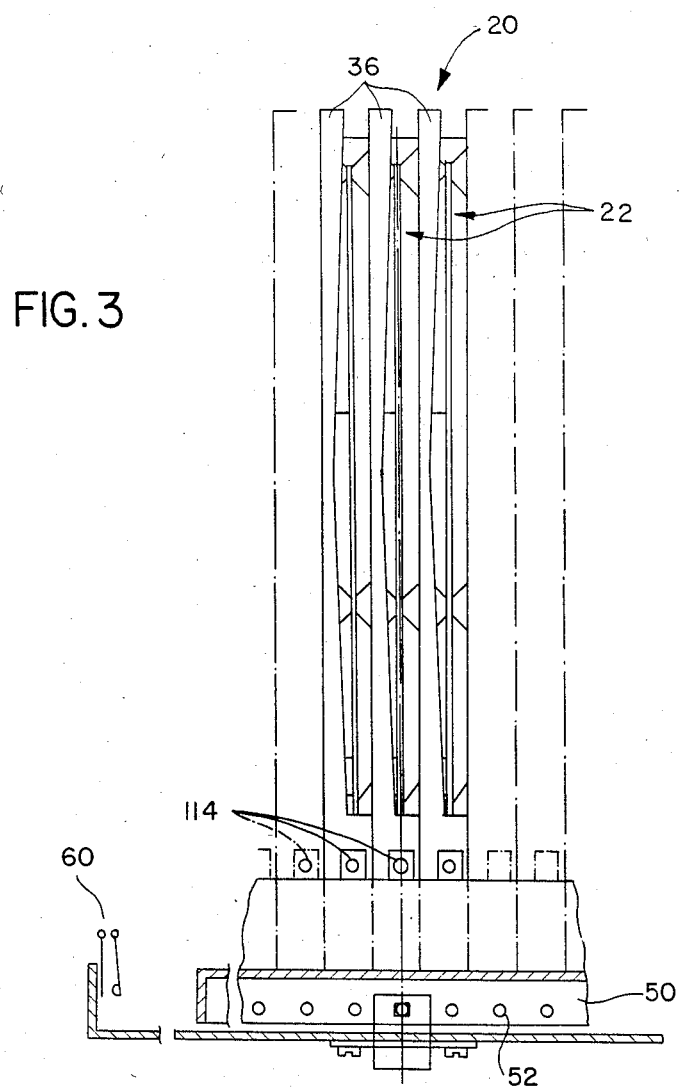
FIG. 3 is a partial front view of the magazine.

Referring to FIGS. 1 and 3, apparatus is shown in the form of a playback unit 10 including a housing 12 for supporting a disc in operative position with an entrance slot 14 for receiving a disc inserted edgewise in its own plane, the playback unit 10 being mounted on the main chassis 16. A tray 18 mounted on the chassis 16 for linear movement perpendicular to the plane of the disc is provided for carrying a magazine 20 having disc storage compartments 22 extending parallel to the plane of the disc. Entrances 24 to the disc storage compartments 22 are located in the front 26 of the magazine and are adapted to be aligned with the entrance slot 14 in the housing 12 of the playback unit 10 by movement into position by the tray 18.

The playback unit 10 is preferably of the helicoidal type more fully described in U.S. Pat. No. 4,513,409 to which reference can be made for a more detailed explanation with respect to its mode of operation. This unit 10 includes a fixed circular frame 28 and a housing 12 in the form of a round member 30 and a cross-shaped member 32 rigidly connected together and rotatably mounted in the frame 28. The mounting is such that the housing 12 simultaneously rotates and moves in the direction of the axis of the disc to shift a disc from the plane of the compartment 22 and the entrance slot 14 in the front wall 34 of the playback unit 10, through which entrance slot 14 a disc enters or leaves the unit 10, and an axially spaced plane in which the disc is held in operative position by a drive hub and a clamping element. When the housing moves the disc to its operative position, the housing moves clear of the disc so that the disc may freely rotate. The facing surfaces of the housing members 30, 32 are preferably concave in shape as described in U.S. Pat. No. 4,510,591.

Now referring to the removable magazine 20, it is formed of wall members 36 arranged side by side to form side by side recesses or compartments 22, and such compartments 22 preferably have a transfer and locking lever 38 mounted therein for locking the disc in the storage position within the compartment 22, said transfer and locking lever 38 being preferably of the kind described in U.S. patent application No. 662,271 filed Oct. 18, 1984. The magazine 20 rests on the tray 18 which is displaceable by means of an endless screw 40 controlled by an electric motor 42 which is connected to the screw by a belt 44. The terminals of the motor 42 are supplied with power from a source under the control of a microprocessor 46 (FIG. 9) insuring the operation of the apparatus.

Figure 9:
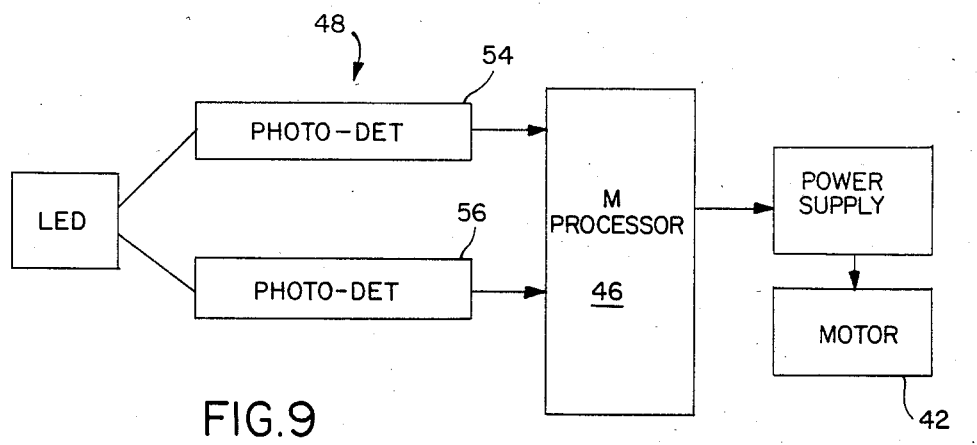
FIG. 9 is a schematic of the control circuit utilizing multi photo detectors.

In keeping with the invention, means are provided for shifting the magazine 20 at high speed, to change the compartment 22, and the disc located therein, in alignment with the playback unit 10 so as to minimize the time interval between the playing of discs. The magazine is movable to shift the compartments edgewise to present successive compartments in alignment with the entrance 14 to the housing 12. The direction of movement is generally transverse to the plane of a disc in a compartment, which can be considered the plane of a compartment, essentially parallel to the side walls of the compartment. As disclosed herein, the magazine movement is linear, but arcuate paths of movement could also be used with an arcuate shaped magazine with side by side compartments. For this purpose a motor control is provided as shown in FIG. 9 including a programmed microprocessor 46 and a multi photo detector assembly 48. Extending downwardly from the bottom of the tray 18 is a tongue 50 provided with openings 52 corresponding respectively to each of the compartments 22. The openings 52 in the tongue 50 and corresponding respectively to the compartments 22 in the magazine 20 are each of relatively large size so that as the magazine 20 is driven at a fast speed by the motor 42, by use of one of the photo detectors 54 the passing of the openings 52 is counted, the large opening size ensuring a correct count even at high speed. When the motor control 46 determines that the magazine 20 is approaching the position where one of the compartments 22 containing a selected disc will be in alignment with the entrance slot 14 of the playback unit 10, the motor 42 is slowed down from the fast to a slow speed and the second photo detector 56 is enabled so that its signal is combined with the signal from the first photo detector 54 in the microprocessor control circuit to determine with high accuracy, due to the angular orientation of at least one of the diode pairs 56, 58, the position of the magazine. The photo detectors may include one light emitting diode 58 and a pair of light receiving diodes 54, 56, as shown, to carry out the required detection, and the slow down and stop sequence of the motor drive.

The location of the magazine 20 may be determined in a known manner by counting down or counting up the signals generated as the openings 52 pass the optical detector assembly 48 during the displacement of the tray from an initial starting position detected by a limit stop switch 60 (FIG. 3).

Figure 2:
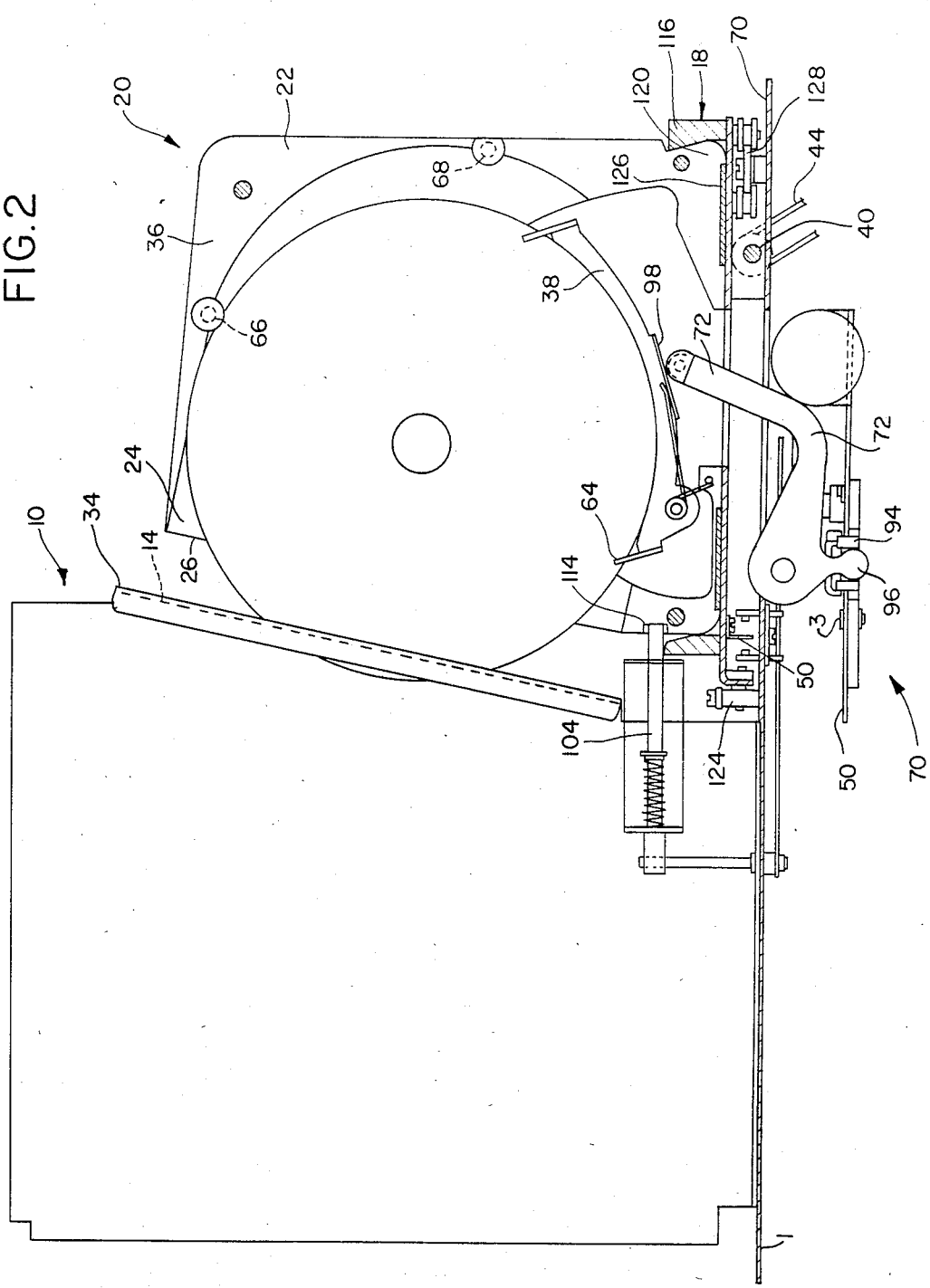
FIG. 2 is a similar view to that of FIG. 1 with portions of the playback unit removed, after the transfer movement of the disc has started.
Figure 4:
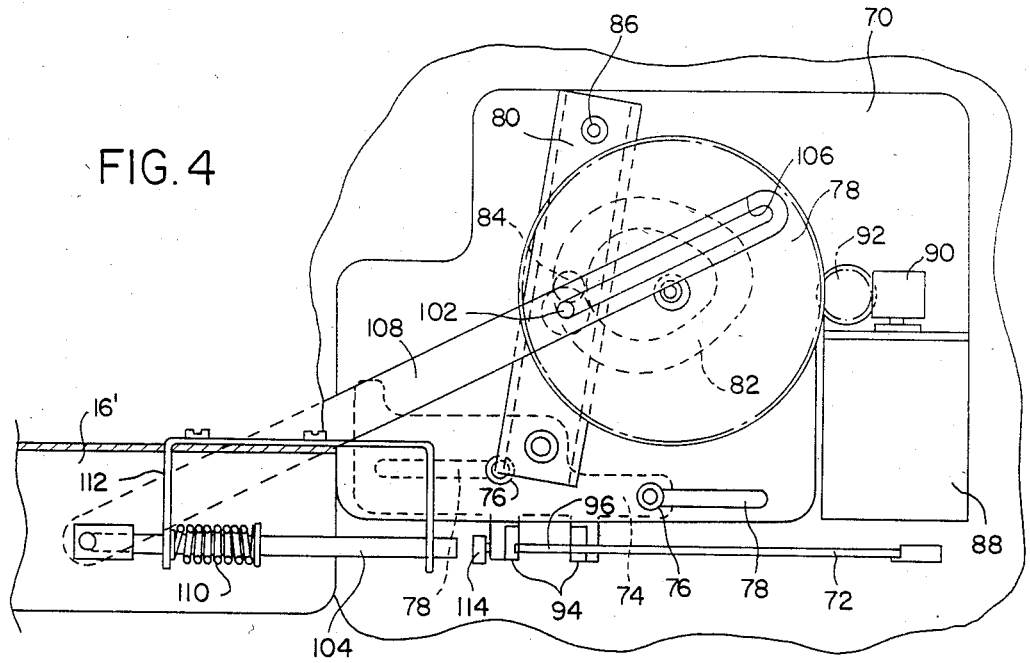
FIG. 4 is a top view of the sub-chassis and a portion of the apparatus chassis.

The compartments 22 of the magazine 20 are each preferably provided with a transfer and locking lever 38 to ensure that a disc may be locked in position and also to permit transfer of the disc to and from its storage position in a compartment 22 of the magazine 20. The locking and transfer lever is pivotally mounted in the respective storage compartment 22, and has a V-shaped member 64 on one end adapted to engage the periphery of a disc to hold the disc against a pair of fixed V-shaped members 66, 68 in the back and top of the compartment. For transferring a disc from a compartment 22, the lever 38 is pivoted in a counterclockwise direction as shown in FIG. 1, about its pivotal axis. To pivot the lever 38, an actuating mechanism is provided mounted on a subchassis 70 below the main chassis, as indicated in FIGS. 1 and 4. The actuating mechanism includes a vertically movable actuator 72 mounted below the tray 18, and the bottom of each of the compartments 22 of the magazine 20 is provided with an opening for allowing the passage of the vertically movable actuator 72 into operative relation with a disc in a compartment 22 aligned with the entrance slot 14 in the playback unit 10. For moving the actuator 72, a member 74 is slidably mounted on the subchassis 70 for linear movement, constrained by a pair of studs 76 and elongated slots 78 (FIG. 4) in the subchassis 70 and in the member 74. The slidable member 74 is moved by a cam 78 through a link 80 which is connected to the member 74 and operated by a profile section 82 in the face of the cam 78 cooperating with a stud 84 extending from the link 80. The link 80 pivots about a fixed axis 86 and its movement is controlled by the stud 84 cooperating with the profile section 82 in the face of the cam 78. The cam 78 is rotatably driven by a motor 88 having an output shaft 90 actuating a gear 92 cooperating with peripheral teeth on the cam 78. The slidable member 74 for the purpose of operating the actuator 74 is provided with two horizontally extending arms 94 which as shown in FIGS. 1, 2 and 4 straddle a projecting finger 96 from the bottom of the actuator 72. Upon horizontal movement of the slidable member 74 the actuator 72 is caused to move vertically from the position shown in FIG. 1 where it is below the tray 18 to the position shown in FIG. 2 where it projects through the openings in the bottom of the tray 18 and the magazine 20 into operative relation with the disc in a particular compartment 22.

In the present case, the actuator 72 engages a plate 98 on the back of the transfer and locking lever 38 within a compartment of the magazine 20 as shown in FIG. 2. Each compartment 22 is provided with such a transfer and locking lever 38 for locking a disc in the storage position in the compartment 22. This transfer and locking lever 38 upon counterclockwise movement, from the position of FIG. 1 to the position of FIG. 2, is operable to unlock a disc and transfer it through the entrance 24 in the front face of the magazine 20 and into the playback unit housing through the entrance slot 14 aligned with the entrance 24 to the particular compartment 22.

Means are provided within the housing 12 of the playback unit 10, herein shown in FIG. 1 as a pivotally mounted roller 100, to take over and insert the disc fully into the housing 12 so that it may be shifted therein to its operative position by helicoidal movement of the housing 12. Transfer of a disc in either direction to or from the housing 12 involves rolling a disc on its edge along a path, and the disc rotation is continued by the helicoidal movement of the housing 12 after the disc has entered the housing in the process of loading the disc, resulting in a very smooth and gentle handing of the disc throughout the entire loading operation. Similarly, the return of a disc involves first a helicoidal movement of the housing 12 during which the disc is started rotating and when the housing 12 having moved helicoidally in the direction of the disc's axis moves the disc to the entrance plane, the motion of the disc is continued and the disc is rolled on its edge from the housing into the compartment, where it comes to rest on the transfer and locking lever 38. To permit the disc to roll on its edge along the entrance plane between the magazine 20 and the housing 12 (and in the return direction), the magazine 20 and housing 12 are both provided with inclined ramp-like surfaces 101A, 101B (FIG. 1) which are substantially a continuation of each other, to permit the smooth rolling movement of the disc between the magazine and housing. The actuator 72 is also operable to guide the compartment transfer and locking lever 38 in its return movement clockwise within the compartment 22 to guide a disc into its fully inserted position, upon return of the disc from the playback unit 10 to a given compartment 22 in the magazine 20.

In carrying out the present invention, means are also provided for locking the magazine 20 in the apparatus which is effective in conjunction with the transfer of a disc from the magazine 20 to the playback unit 10. To this end, on the upper face of the same cam 78 opposite to that provided with the profile section 82, is provided a fixed stud 102 which is operable upon rotation of the cam 78 to shift a locking member in the form of a rod 104 into engagement with the magazine 20 to lock it to the tray 18. The stud 102 on the cam 78 through an elongated slot 106 in a link 108 controls the movement of the link 108. The other end of the link 108 is connected to the locking rod 104 which is provided with an actuating spring 110 and is guided by openings provided in a bracket 112 supported on the main chassis 16. The locking rod 104 is adapted to enter one of a series of openings 114 arranged in members on the front of the magazine 20, each opening 114 corresponding to one of the compartments 22 in the magazine 20.

When the cam 78 is in its rest position (FIG. 1) and when the disc contained in a compartment 22 is locked by the compartment lever 38 in the storage position, the rod 104 is maintained at a retracted position as shown in FIG. 1 against the force of the actuating spring 110. As the cam 78 rotates upon start of the disc transfer cycle, the link 108 is automatically shifted to a position allowing the rod 104 under the force of the stressed actuating spring 110 to move forward and penetrate the opening 114 corresponding to the compartment 22 containing a selected disc and which is aligned with the playback unit 10. The locking rod 104 is maintained in the opening 114 of the magazine 20 until the cam 78 returns to its rest position after the complete cycle has concluded, including return of the disc from the playback unit 10 to the magazine 20. Consequently, the magazine 20 is locked on its tray 18 for the entire cycle of changer operation.

Figure 7:
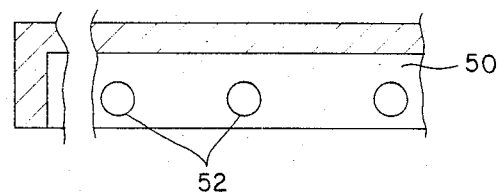
FIG. 7 is a fragmentary view of a portion of the magazine having openings for the photo detector assembly.
Figure 8:
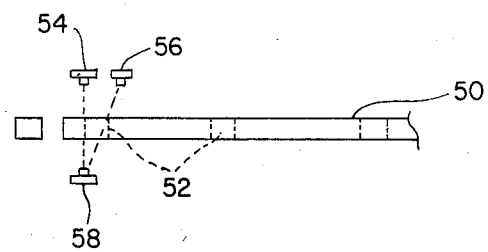
FIG. 8 is a top fragmentary view illustrating schematically the location of multi photo detectors.

Rather than providing a plurality of openings 114, a horizontal groove can be provided in the base of the magazine 20, the advantage of the individual openings 114 being that they assist in accurately aligning the compartments 22 of the magazine 20 relative to the playback unit 10. Alternatively, precise alignment may be obtained through the multi detector assembly 48 and control shown in FIGS. 6–8.

Figure 5:
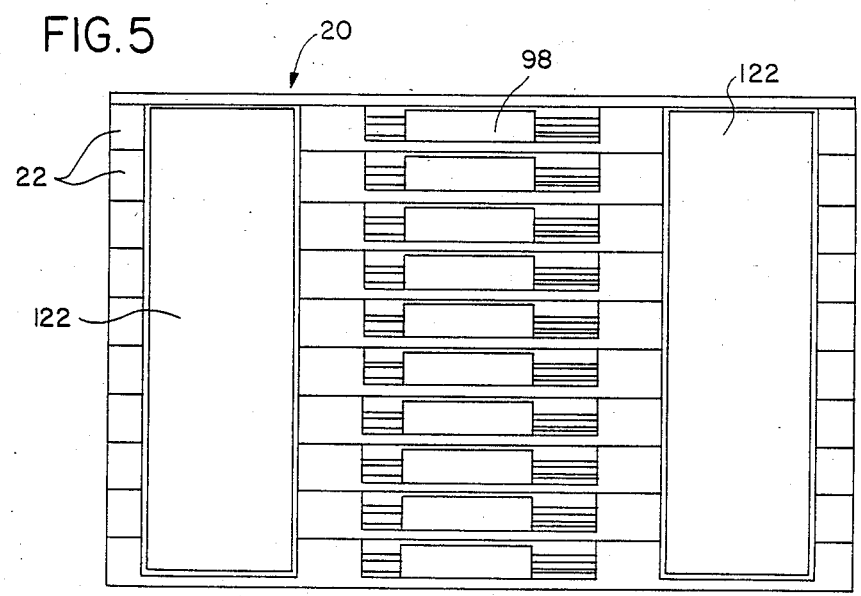
FIG. 5 is a bottom view of the magazine.

As shown in FIGS. 1 and 2, the tray 18 is formed with an overhang 116 relative to the base of the magazine 20 on the back edge 120 opposite the locking rod 104 such that in order to remove the magazine 20 it must be pivoted about the back edge 120 and then raised from the tray 18. Additional means are provided for holding the magazine 20 in its tray 18 without locking it in place, herein shown as a magnetic holder including two strips 122 (FIG. 5) of magnetic material incorporated in the base of the magazine 20 and cooperating with the tray base which, for cooperation with the magnetic strips, is made of a magnetic metal. In this way the magazine 20 is held very simply and reliably while the necessary pivotal movement for withdrawing the magazine 20 ensures that the removal of the magazine 20 is simple and reliable.

The tray 18 is supported on the chassis 16 of the apparatus by rollers 124 rotatable about a horizontal axis on the front of the tray 18, and by a pair of rollers 126 straddling a horizontal plate 128 and arranged for rotation about vertical axes, mounted below the back edge 120 of the tray 18. The drive for moving the tray 18 linearly is through a screw 40 from the drive motor 42 as previously indicated.

Figure 6:
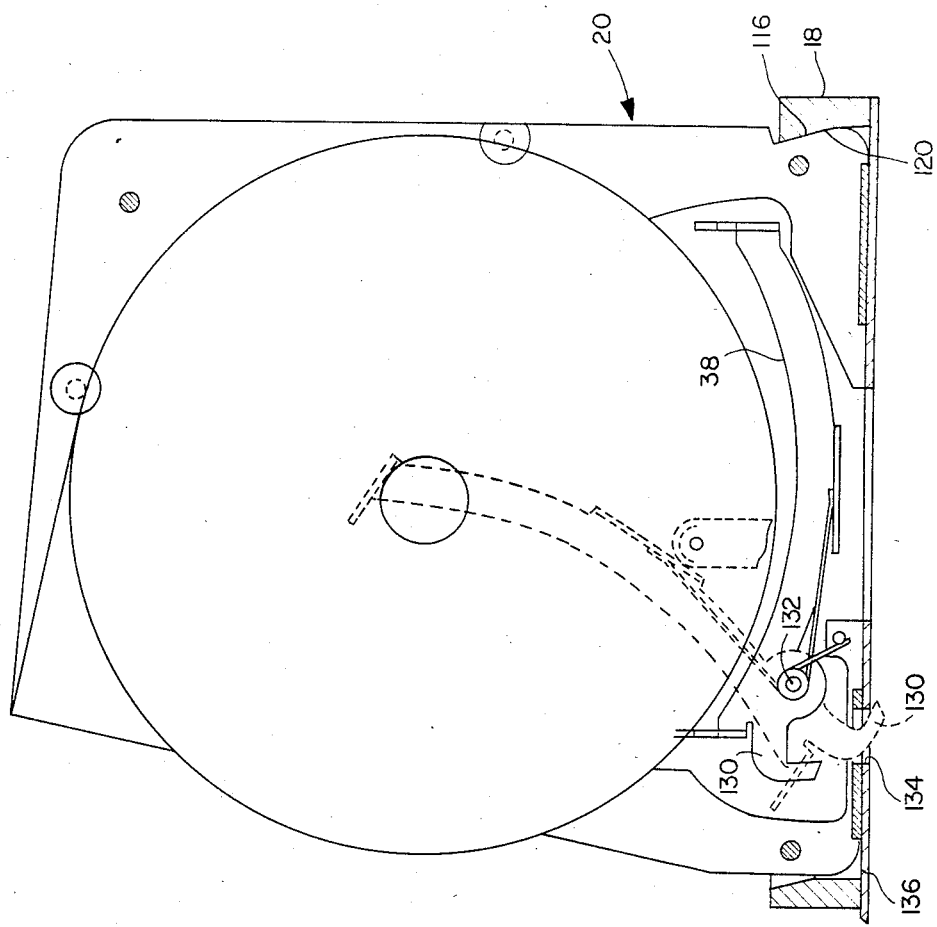
FIG. 6 is a side view of a magazine with a transfer member adapted to lock the magazine to the tray.

An alternative mechanism is shown in FIG. 6 for locking the magazine 20 to the tray 18 responsive to a disc being transferred from the magazine 20. As there shown, the transfer lever 38 within each compartment has a curved hook-shaped extension 130 on the lower end thereof adjacent the pivotal support axis 132 of the transfer lever 38. To lock the magazine, as the transfer lever 38 pivots to transfer a disc the extension 130 on the lower end thereof swings into and penetrates an aperture 134 on a fixed plate 136 in the bottom of the tray 18, to project into engagement with the opposite side of the locking plate to serve as a latch to lock the magazine in the tray. The overhang 116 holds the back edge 120 of the magazine from being lifted out of the tray when the extension 130 is in locking engagement with the fixed plate 136 of the tray.

We claim:

1. Apparatus for recording and/or playback of recordings on discs including a selective disc changer, said apparatus comprising:

a chassis;

a playback unit including a housing for supporting a disc in operative position and having an entrance slot for receiving a disc inserted edgewise in its own plane;

a removable magazine carried on said chassis and having a plurality of disc storage compartments arranged side by side, means for mounting said magazine for movement along a path having a portion generally transverse to said plane to position said compartments successively into alignment with said plane, each of said compartments having an entrance located in a face of said magazine, different ones of said entrances being adapted to be aligned with said entrance slot;

means for transferring a disc from one of said storage compartments in said magazine into said housing of said unit through said entrance slot and for returning a disc from the housing to a storage compartment in the magazine through one of said entrances;

means for locking said magazine against being removed from said mounting means on said chassis; and means for actuating said locking means responsive to actuation of said transferring means for transferring a disc from the magazine to ensure that the magazine is locked against removal from the time that one of the discs stored in a compartment of the magazine has left its storage position until it is returned to the magazine compartment.

2. Apparatus according to claim 1 wherein said locking means includes a locking member engageable with the magazine.

3. Apparatus according to claim 1 including a movable tray on said chassis for carrying said magazine, said magazine being removable from said tray.

4. Apparatus according to claim 1 wherein said transferring means includes a vertically movable actuator mounted below the magazine, and the bottom of each of the compartments of the magazine is provided with an opening allowing the passage of the movable actuator into operative relation with a disc in a compartment aligned with the entrance slot in said playback unit for transferring the disc to and from the compartment.

5. Apparatus according to claim 4 wherein said actuator is pivotally mounted and said transferring means includes a slidable member controlled by a cam for pivoting said actuator.

6. Apparatus according to claim 5 wherein said means for mounting said magazine includes a movable tray on said chassis for carrying said magazine, said magazine being removable from said tray, and wherein said locking means includes a locking means operated by the same cam to engage the magazine and hold it from removal from the tray.

7. Apparatus according to claim 6 wherein said locking means includes a spring for actuating said member into engagement with said magazine upon release by said link under the action of said cam.

8. Apparatus according to claim 6 wherein said magazine is provided with a plurality of openings corresponding respectively to said compartments, and said locking member is engageable in each of said openings to lock the magazine and align the respective compartment with the entrance slot in the playback unit.

9. Apparatus according to claim 6 wherein said magazine is provided with means defining longitudinally aligned openings, and said locking member is engageable in said open-defining means to lock the magazine to the tray.

10. Apparatus according to claim 3, said removable magazine having a base including magnetic material and said tray having a magnetic metal base for cooperation with said magnetic material to hold the magazine on the tray.

11. Apparatus according to claim 1, including control means for positioning said magazine including a member having a series of openings and photo detectors operable to sense the position of said openings to position said magazine relative to said playback unit.

12. Apparatus according to claim 11 wherein said photo detector includes a pair of spaced detector elements on one side of said opening operative singly to coarsely control magazine position and in conjunction to precisely control magazine position and wherein said control means includes means for operating said tray at fast speed under coarse control and slow speed under precise control, and for changing from fast to slow speed as the magazine approaches a selected position.

13. Apparatus for recording and/or playback of recordings on discs including a selective disc changer, said apparatus comprising:
- a chassis;
- a playback unit including a housing for supporting a disc in operative position with an entrance slot for receiving a disc inserted edgewise in its own plane;
- a tray mounted on said chassis for movement in a path having a portion generally transverse to said plane;
- a magazine movably received on said tray having a plurality of disc storage compartments arranged side by side and successively movable by said tray into alignment with said plane, each of said compartments having an entrance located in a face of said magazine, different ones of said entrances being adapted to be aligned with said entrance slot;
- means for transferring a disc from one of said storage compartments in said magazine into an operative position in said housing of said unit through said entrance slot and for transferring a disc from the housing to a storge compartment in the magazine;
- means for locking said magazine against being removed from said tray; and
- means for actuating said locking means responsive to actuation of said transferring means for transferring a disc from the magazine to ensure that the magazine is locked against removal from the time that one of the discs stored in a compartment of the magazine has left its storage position until it is returned to the magazine compartment.

14. Apparatus according to claim 13, including a transfer member in each compartment of the magazine for transferring a disc to and from the respective compartments upon actuation by a member carried by the chassis.

15. Apparatus for recording and/or playback of recordings on discs including a selective disc changer, said apparatus comprising:
- a chassis;
- a playback unit means including a housing mounted on said chassis for forward and reverse helicoidal movement between a disc operating plane and an entrance plane for receiving a disc inserted edgewise in its own plane;
- a tray mounted on said chassis for movement in a path having a portion extending generally transverse to said entrance plane;
- a magazine removably received on said tray having a plurality of disc storage compartments arranged side by side and successively movable by said tray into alignment with said entrance plane, each of said compartments having an entrance located in a face of said magazine, different ones of said entrances being adapted to be aligned with said entrance slot upon movement along said path by said tray; and
- means for rolling a disc from one of said storage compartments in said magazine into said housing of said unit along said entrance plane and for returning a disc from the housing to the same storage compartment, the playback unit means and said rolling means being arranged such that the forward and reverse rotational direction of the helicoidal movement of the playback unit is the same as the direction of rolling movement of a disc received in the playback unit and returned from the playback unit.

16. Apparatus according to claim 15 in which said helicoidal unit means and rolling means cooperate to ensure that the disc continuously rotates about its axis during its movement from a compartment to an operative position in the operating plane.

17. Apparatus for recording and/or playback of recordings on discs including a selective disc changer, said apparatus comprising:
- a chassis;

a playback unit including a housing for supporting a disc in operative position with an entrance slot for receiving a disc inserted edgewise in its own plane;

a removable magazine having a plurality of disc storage compartments arranged side by side, each of said compartments having an entrance located in the front face of said magazine, different ones of said entrances being adapted to be aligned with said entrance slot;

means on said chassis for providing relative movement of said playback unit and said magazine for aligning the entrance slot of said housing with different ones of said entrances in said magazine;

means for transferring a disc from one of said storage recesses in said magazine into said housing of said unit through said entrance slot and for returning a disc from the housing to a storage compartment in the magazine;

means for locking sid removable magazine against being removed from said apparatus; and means for actuating said locking means responsive to actuation of said transferring means for transferring a disc from the magazine to ensure that the magazine is locked against removal from the time that one of the discs stored in a compartment of the magazine has left its storage position until its is returned to the magazine compartment.

18. Apparatus according to claim 17, wherein said locking means includes a locking member engageable with the magazine.

19. Apparatus according to claim 17, wherein said locking means includes a locking member in said magazine for engaging the chassis.

20. Apparatus according to claim 17 including a movable tray on said chassis for carrying said magazine and providing said relative movement, the playback unit being fixed on said chassis, said locking means including a locking member engaging the magazine and the tray.

* * * * *